(12) United States Patent
Yamaguchi et al.

(10) Patent No.: US 8,482,516 B2
(45) Date of Patent: *Jul. 9, 2013

(54) IMAGE DISPLAY MEDIUM, IMAGE DISPLAY DEVICE, AND IMAGE DISPLAY METHOD

(75) Inventors: Yoshiro Yamaguchi, Atsugi (JP);
Kiyoshi Shigehiro, Fujisawa (JP);
Yoshinori Machida, Atsugi (JP);
Motohiko Sakamaki, Hadano (JP);
Takeshi Matsunaga, Hadano (JP)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,608

(22) Filed: Jun. 12, 2012

(65) Prior Publication Data

US 2012/0249609 A1 Oct. 4, 2012

Related U.S. Application Data

(63) Continuation of application No. 12/458,542, filed on Jul. 15, 2009, now Pat. No. 8,228,291, which is a continuation of application No. 09/940,801, filed on Aug. 29, 2001, now Pat. No. 7,616,185.

(30) Foreign Application Priority Data

Nov. 2, 2000 (JP) ................................ 2000-335702

(51) Int. Cl.
*G09G 3/34* (2006.01)
(52) U.S. Cl.
USPC .............................. 345/107; 345/87; 359/296

(58) Field of Classification Search
USPC ...... 345/48–49, 72, 77, 80–107, 214; 349/90; 359/296
See application file for complete search history.

(56) References Cited

U.S. PATENT DOCUMENTS

| | | | |
|---|---|---|---|
| 5,872,654 | A | 2/1999 | Shirochi |
| 5,959,701 | A | 9/1999 | Watanabe et al. |
| 6,040,884 | A | 3/2000 | Yasuda et al. |
| 6,113,810 | A | 9/2000 | Hou et al. |

(Continued)

FOREIGN PATENT DOCUMENTS

| | | |
|---|---|---|
| JP | A-10-003177 | 1/1998 |
| JP | A-10-142598 | 5/1998 |
| JP | A-2009-258806 | 9/2000 |
| JP | A-2000-347483 | 12/2000 |

OTHER PUBLICATIONS

Gugrae-Jo et al., "New Toner Display Device (I)," Japan Hardcopy, 1999, pp. 249-252.

(Continued)

*Primary Examiner* — William Boddie
*Assistant Examiner* — Mansour M Said
(74) *Attorney, Agent, or Firm* — Oliff & Berridge, PLC (57) ABSTRACT

An image display medium comprises a display member, a back substrate, spacers having a cell structure held between the substrates, and first particles and second particles, whose colors and charging polarities are different from one another, enclosed between the display member and back substrate. The display member includes a transparent support base, a transparent electrode formed thereon, a transparent dielectric layer formed on the transparent electrode, filters formed on the opposite side from the transparent electrodes side of the support base, and a protective layer formed thereon.

15 Claims, 9 Drawing Sheets

U.S. PATENT DOCUMENTS

| | | | |
|---|---|---|---|
| 6,124,910 | A | 9/2000 | Nishida et al. |
| 6,184,856 | B1 | 2/2001 | Gordon, II et al. |
| 6,271,823 | B1 * | 8/2001 | Gordon et al. ............... 345/107 |
| 6,376,828 | B1 | 4/2002 | Comiskey |
| 6,392,732 | B1 | 5/2002 | Oh-e et al. |
| 6,597,419 | B1 | 7/2003 | Okada et al. |
| 6,621,550 | B1 * | 9/2003 | Arakawa et al. ............. 349/178 |
| 6,639,580 | B1 | 10/2003 | Kishi et al. |
| 6,657,612 | B2 | 12/2003 | Machida et al. |
| 8,228,291 | B2 * | 7/2012 | Yamaguchi et al. .......... 345/107 |
| 2002/0113871 | A1 | 8/2002 | Sakamaki et al. |

OTHER PUBLICATIONS

Gugrae-Jo et al., "New Toner Display Device (II)," Japan Hardcopy, 1999, pp. 10-13.

* cited by examiner

| R | G | B | R | G | B | R | G | B |
|---|---|---|---|---|---|---|---|---|
| R | G | B | R | G | B | R | G | B |
| R | G | B | R | G | B | R | G | B |
| R | G | B | R | G | B | R | G | B |
| R | G | B | R | G | B | R | G | B |
| R | G | B | R | G | B | R | G | B |

FIG. 11

| Y | M | C | Y | M | C | Y | M | C |
|---|---|---|---|---|---|---|---|---|
| Y | M | C | Y | M | C | Y | M | C |
| Y | M | C | Y | M | C | Y | M | C |
| Y | M | C | Y | M | C | Y | M | C |
| Y | M | C | Y | M | C | Y | M | C |
| Y | M | C | Y | M | C | Y | M | C |

| W | G | W | R | W | B | W | G | W |
|---|---|---|---|---|---|---|---|---|
| R | W | B | W | G | W | R | W | B |
| W | G | W | R | W | B | W | G | W |
| R | W | B | W | G | W | R | W | B |
| W | G | W | R | W | B | W | G | W |
| R | W | B | W | G | W | R | W | B |

IMAGE DISPLAY MEDIUM, IMAGE DISPLAY DEVICE, AND IMAGE DISPLAY METHOD

This is a Continuation of application Ser. No. 12/458,542, filed Jul. 15, 2009, which is a Continuation Application of application Ser. No. 09/940,801 filed Aug. 29, 2001 and claims priority to Japanese Patent Application No. 2000-335702, filed Nov. 2, 2000. The disclosures of the prior applications are hereby incorporated by reference herein in their entirety.

BACKGROUND

The present invention relates to an image display medium, image display device, and image display method, and more particularly to an image display medium containing two types of particles whose colors and charging polarities are different from one another, and an image display device, and image display method using the medium.

As image display media capable of displaying images, known as electronic paper, known examples include those making use of rotation of colored particles (twisting ball display), electrophoresis, magnetophoresis, thermal rewritable displays, image storable liquid crystals, electrochromy and the like. Of these image display media, the thermal rewritable display medium and image storable liquid crystals are excellent in storage of an image, but the background is not sufficiently white as in ordinary paper, the contrast between the image area and non-image area (background) is low, and it is difficult to display a sharp image. In particular, in a color display, only light of specific wavelengths is transmitted, and the quantity of light utilized in the image display is small as compared with the quantity of irradiated light.

When using color filters, three color filters, a red filter, green filter and blue filter, are often used as a set. One pixel electrode is disposed at each position opposite to one of the filters on a glass substrate. Since red, green and blue are the three primaries of additive color processes, all colors can be created by properly mixing these three primary colors. For example, when all of red, green and blue are mixed, white is created. The blue, green and red filters transmit visible light of wavelengths from about 400 nm to about 500 nm, from about 500 nm to about 600 nm, and from about 600 nm to about 700 nm, respectively, and absorb or reflect the remaining wavelength ranges of visible light. In other words, each color filter transmits only about ⅓ of the light in the range 400 nm to 700 nm, and the light in the remaining ⅔ of the range is not utilized. Accordingly, when each color filter is irradiated with white light, in principle, the transmissivity of the color filter is about 30%.

The actual transmissivity of a polarizer or a color filter is lower than the theoretical value, and further, when the image display medium has an active element such as a TFT, the utilization efficiency of light is lowered by its aperture ratio. Accordingly, when the image display medium is of a reflective type, it is difficult to achieve a final utilization efficiency, that is, reflectivity, of 10% or more unless a special measure is applied to the light reflective layer or the like. The current target of brightness or whiteness in an image display medium is equivalent to that of a newspaper, so a reflectivity of about 60% is required, but since this target value is far beyond the theoretical limit in the image display medium of the above-described system, evidently it is required to change the method radically, including omission of a polarizer, in order to achieve the target.

In a display medium utilizing electrophoresis or magnetophoresis without using a polarizer, colored particles that are movable by applying an electric field or magnetic field are dispersed in a white liquid, and an image is formed by, for example, adhering colored particles to the display surface to display the color of colored particles in the image area, and removing the colored particles from the display surface in the non-image area to display the white color of the white liquid. Since the colored particles cannot be moved without action of an electric field or magnetic field, the image can be stored in this display medium. In such display media, the background may be displayed in a clean white, but a sufficient image density cannot be obtained in the image area, because the white liquid enters gaps between the colored particles. As a result, sufficient contrast cannot be obtained between the image area and non-image area, and it is difficult to display a sharp image. Further, if the display medium is bent when the medium is removed from an image display device, the white liquid may leak out from the display medium.

The twisting ball display is designed to display an image by inverting spherical particles, half the surface of the particles being colored white and the other half being colored black, by the action of an electric field. For example, an electric field is applied thereto such that the black sides orient toward the display side in the image area and the white sides orient toward the display side in the non-image area. The particles in this display medium are not inverted unless an electric field is applied thereto, so the image can be stored. Inside the display medium, oil is present only in the cavities around the particles, and since almost only solid material is contained in the medium, it is relatively easy to form the display medium into a sheet form. In this display medium, if an electric field is applied to the display medium so that the entire display area is white, rays of the light incident upon the display medium that stray into gaps between the balls are not reflected but are lost in the interior of the medium. Accordingly, in principle, 100% white cannot be displayed. Moreover, because of light absorption or light scattering in the cavities, only a grayish white color is displayed. Further, it is difficult to invert the particles completely, which results in a reduction of contrast and it is hence difficult to display a sharp image. In addition, since the particle size is required to be smaller than the pixel size, fine particles painted in different colors must be prepared for displaying an image of high resolution, and sophisticated manufacturing techniques are required. Thus, in these image display media, the display performance of at least one of white and black is low, and the color saturation is low when a color image is displayed using such media. Moreover, these image display media are made of materials which have poor light fastness, and which are apt to degrade at high temperatures, and they cannot be used outdoors. In addition, when the media are left standing in automobile compartments at high temperatures, there have been problems such that images cannot be displayed.

Further, as an image display medium with a white background, it has been proposed to use a medium in which electro-conductive color toner and white particles are enclosed between a pair of opposing substrates. In this image display medium, electric charge is injected into the electro-conductive color toner through a charge transfer layer provided on the inner surface of an electrode of a back substrate, and the electro-conductive toner to which the charge is injected is moved to the display substrate by the electric field between the electrode substrates, and is adhered to the inner surface of the display substrate to display an image ("Toner Display", Japan Imaging Society, Japan Hardcopy '99 papers, pp. 249-252; Japan Hardcopy '99 fall papers, pp. 10-13). This image display medium has advantages that the light fastness of the medium is high in principle, the medium can be driven even if left in high temperatures, and the medium in principle can change over the pixel colors completely. In this image display medium, however, there are electro-conductive color toner particles which do not contact the charge transfer layer and electro-conductive color toner particles which are isolated from other electro-conductive color toner particles. Electric charge is not injected into these electro-conductive color toner particles, and they are not movable by an electric field. Accordingly, these color toner particles are located randomly between the substrates, and contrast cannot sufficiently be enhanced.

The present inventors have proposed an image display medium comprising a pair of substrates and a plurality of types of particle groups, whose colors and charging characteristics are different from one another, enclosed between these substrates (Japanese Patent Application No. 2000-165138). In this display medium still, since the particles are not moved if an electric field is not applied to the particles, the image can be stored. Further, since the entire image display medium is composed of solid substances, liquid does not leak. However, if one attempts to display a multi-color image by using this image display medium, black color must be displayed as a mixed color of chromatic color by using chromatic colors particles and white particles, and therefore a black image having a sufficient density cannot be obtained.

SUMMARY

The present invention is devised in the light of the above background, and it is hence an object of the present invention to provide an inexpensive image display medium which has high light fastness, high heat resistance and simple structure, which is capable of displaying a multi-color image with high contrast, and which is readily adjustable for color, and an image display device and image display method using the same.

The present invention is to provide an image display medium comprising a display substrate, a back substrate, spacers that form a gap between the display substrate and the back substrate, two types of particles, whose colors and charging polarities are different from one another, enclosed between the display substrate and the back substrate, and filters of a plurality of colors for transmitting light of specific wavelengths.

According to the present invention, the filters transmit light of specific wavelengths incident thereon. The transmitted light is absorbed or reflected by the particles adhered onto the display substrate, and the reflected light is transmitted again through the filters. As a result, colors rendered by the filters and particles are displayed on the display substrate.

In this image display medium, the two types of particles preferably have white and black colors, respectively. White particles have the highest lightness and reflect light best, while black particles absorb light best, so that a high display contrast can be obtained. These two types of particles are preferred to be at least particles of which the surface is metal, and black particles, respectively. Particles of which the surface is metal have a high light reflectance. Accordingly, when such particles are combined with black particles, a high display contrast can be obtained. Further, the two types of particles are preferably retroreflective particles and black particles, respectively. The retroreflective particles have a property of reflecting incident light about 100% in the incident direction, and therefore, when such particles are combined with black particles, a higher display contrast can be obtained.

The display substrate and the filters may be integrally formed.

The filters may contain colored fine particles. When the fine particles are uniformly dispersed in the filters, a uniform color formation is achieved.

The filters are divided into plural regions, and each region has colors of a combination that forms an achromatic color by an additive color process. Colors of successive regions are composed of this combination, and when the two types of particles are white and black, a full-color image can be displayed.

The plural colors of the filters may be arrayed in stripes. The filter patterns may be any one of a matrix mosaic pattern, a triangle pattern, and a four-pixel array pattern.

When the filters are disposed on the display substrate and the filters and the substrate are integrally constructed, it is preferred to provide a protective layer having a function of diffusing light incident upon the filters. As a result, an undesirable reflected image formed on the display surface, which is due to reflection of light incident upon the surface at the display side of the display substrate, can be prevented, and the image quality can be improved.

If the entire surface of the filters is chromatic, the quantity of light may be reduced. Accordingly, if the filters are divided into a plurality of chromatic regions, it is preferred to dispose colorless regions between adjacent chromatic regions. Colors having different hues can be displayed in chromatic regions, and, by adhering white particles to the portions corresponding to the colorless regions of the display substrate, reduction of the amount of light can be prevented. Further, by adhering white particles to portions of the display substrate opposite to colorless regions in the vicinity of pixel regions where an image is displayed, and adhering black particles to portions opposite to colorless regions in the vicinity of pixel regions where an image is not displayed, the contrast of lightness of the display image can be enhanced. Moreover, color mixing is eliminated in the boundary portion of chromatic regions, so that color impurity can be prevented.

The spacers are preferably colorless and transparent in order to avoid adverse effects on the display image.

The display substrate and back substrate can each be provided with a plurality of electrodes facing each of the regions into which the filters are divided. As a result, a single color pixel can be driven independently. When there are colorless regions between chromatic regions of the filters and the two types of particles are white and black, the above effects can be achieved by applying voltage to the electrodes in other regions than the pixels of the display substrate.

The present invention provides an image display device comprising the above-described image display medium, and an irradiating means for irradiating white light towards the display substrate of the image display medium. As a result, the amount of light irradiated to the image display medium can be increased, and a higher contrast can be obtained.

In this image display device, the irradiating means may irradiate white light to the interior of the device from a side end surface of the display substrate.

Further, the present invention provides an image display device including a display substrate, a back substrate, spacers for forming a gap between the display substrate and the back substrate, two types of particles, whose colors and charging polarities are different from one another, enclosed between the display substrate and the back substrate, irradiating means for irradiating a white light to the interior from the side of the display substrate, and spectrally light-splitting means disposed between the irradiating means and the display substrate.

This image display device can be irradiated with monochromatic light emitted from the spectrally light-splitting means directly into the device, so that a multi-color image having a higher contrast can be displayed.

The image display method of the present invention is an image display method for displaying an image by using a display substrate, a back substrate, spacers for forming a gap between the display substrate and the back substrate, two types of particles, whose colors and charging polarities are different from one another, enclosed between the display substrate and the back substrate, and filters having a plurality of colors for transmitting light of specific wavelengths, in which the light of specific wavelengths transmitted through the filters having a plurality of colors is reflected partly or entirely by one of the two types of particles to display a color having a first color tone, and the light of specific wavelengths is partly or entirely absorbed by the other one of the two types of particles to display a color of a second color tone which is different from the first color tone, thereby displaying an image.

According to the image display method of the present invention, an image is displayed by using the display substrate, the back substrate, the spacers for forming a gap between the display substrate and the back substrate, the two types of particles whose colors and charging polarities are different from one another enclosed between the display substrate and the back substrate, and the filters having a plurality of colors for transmitting light of specific wavelengths. The light of specific wavelengths transmitted through the filters having a plurality of colors is partly or entirely reflected by one of the two types of particles, and a color of the first color tone is displayed. The light of specific wavelengths is partly or entirely absorbed by the other one of the two types of particles, and a color of the second color tone, which is different from the first color tone, is displayed. In the image display method of the present invention, by transmitting through the filters, the image is colored, and by using two types of particles having mutually different colors, the contrast of the display can be ensured. For example, by using particles having a high reflectivity and particles of a high light-absorption as the two types of particles, an image of high display contrast can be displayed.

DETAILED DESCRIPTION OF EMBODIMENTS

The present invention will be described hereinafter in detail.

An image display medium of the present invention comprises a display substrate, a back substrate, spacers for forming a gap between the display substrate and the back substrate, and two types of particles, whose colors and charging polarities are different from one another, enclosed between the display substrate and the back substrate.

Each substrate is generally composed of a support base and electrodes. The support base is made of glass or plastic, for example, polycarbonate resin, acrylic resin, polyimide resin, polyester resin, epoxy resin or the like. The electrodes are made of oxides of indium, tin, cadmium, antimony and the like, composite oxides such as ITO, metals such as gold, silver, copper, and the like, nickel, or organic electro-conductive materials such as polypyrrole, polythiophene and the like. These materials can be used as a single layer film, mixed film or composite film, and can be formed by vapor deposition, sputtering, coating and other methods. The thickness is generally about 100 to 2000 angstroms when the vapor deposition or sputtering method is used. The electrodes can be formed in a desired pattern, for example, matrices or stripes for enabling passive matrix driving, by etching or other known methods of making a conventional liquid crystal display device or printed circuit board.

Electrodes may be embedded in the support base. In this case, the materials of the support base serve as a dielectric layer as well, as described hereinafter, and may affect the charging property and flowability of particles, and hence these materials should be selected appropriately in accordance with composition of particles and the like.

Further, the electrodes may be separated from the substrate and disposed outside the display medium. In this case, the display medium is placed between the electrodes, and thus the distance between the electrodes is longer and electric field strength may be weaker. Accordingly, devices are required such that the thickness of the substrates of the display medium or the distance between the substrates is reduced in order to obtain a desired electric field strength.

In order to enable active matrix driving the substrate may have a TFT (thin film transistor) for each pixel. In order to facilitate lamination of wiring and packaging of parts, the TFT is preferably formed on the back substrate rather than the display substrate.

When the electrodes are formed on the support base, in order to prevent leakage between the electrodes, which may result in breakage of the electrodes or sticking of particles, a dielectric film (insulating material) is optionally formed on the electrodes. The dielectric film is made of polycarbonate, polyester, polystyrene, polyimide, epoxy, polyisocyanate, polyamide, polyvinyl alcohol, polybutadiene, polymethyl methacrylate, copolymer nylon, ultraviolet curing acrylic resin, fluorine resin, or the like. As well as the insulating materials as described above, insulating materials in which a charge transfer substance is incorporated may be used. By incorporating the charge transfer substance therein, effects can be obtained such that the charging property of the particles when charge is injected into the particles is enhanced, or the amount of charge of the particles is stabilized, due to leakage of particle charge if the amount of charge of the particles becomes excessively high. As the charge transfer substance, for example, positive hole transfer substances, such as hydrazone compounds, stilbene compounds, pyrazoline compounds, aryl amine compounds, and the like, may be used. Electron transfer substances, such as fluorenone compounds, diphenolquinone derivatives, pyran compounds, zinc oxide and the like, may also be used. Further, a self-supporting resin having a charge transfer property may be used. Specific examples thereof include polyvinyl carbazole, and a polycarbonate formed by polymerizing a specific dihydroxy aryl amine and bischloroformate as disclosed in U.S. Pat. No. 4,806,443. Since the dielectric film may affect charging property or flowability of particles, the film should be selected properly in accordance with the composition of particles and the like. The display substrate, which is one of the substrates, is required to transmit light, and it is thus preferred to select a transparent material from the materials above.

The image display medium of the present invention may have filters having plural colors for transmitting light of specific wavelengths. These filters contain coloring materials. Examples of the coloring materials include ionic dyes and pigments (colored fine particles) capable of forming a film. Examples of the ionic dyes are triphenyl methane phthalides, phenosazines, phenothiozines, fluoresceines, indolyl phthalides, spiropyranes, azaphthalides, diphenyl methanes, chromenopyrazoles, leuco auramines, azomethines, rhodamine lactals, naphtholactams, triazenes, triazole azos, thiazole azos, azos, oxazines, thiazines, benzothiazole azos, quinone imines, and hydrophilic dyes having a carboxyl group, an amino group or an imino group. As the pigments, known pigments of red, green, blue or other colors may be used without any particular limitation. The color hue reproduction is better if the particle size of the pigment is smaller. When a color filter is formed, from the viewpoints of transparency of the color filter layer and dispersibility of the pigment, the average particle size of the pigment is preferably 200 nm, more preferably 100 nm, or less. It is desirable to use the pigments, because they have excellent light fastness.

In the present invention, the colors of the filters may form a combination that forms an achromatic color by an additive color process, that is, R (red), G (green) and B (blue), or a combination that forms black color by a subtractive color process, that is, Y (yellow), M (magenta) and C (cyan), or another combination. In particular, in order to display a full-color image, the combination R, G and B or the combination Y, M and C is preferred, and, in particular, the combination R, G and B is more preferable.

When an ionic dye, or an ionic dye and a pigment, is used, a binder resin is not necessarily needed, but when solely pigment is used as coloring material, a binder resin is used. The binder resin is preferred to be transparent or pale, and examples of such binder resins include polyester and styrene-acrylic resins.

Figure 10:
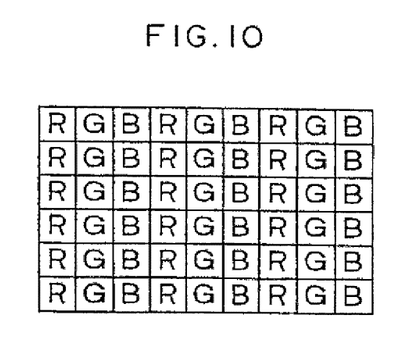
FIG. 10 illustrates an example of a filter usable in the present invention.
Figure 11:
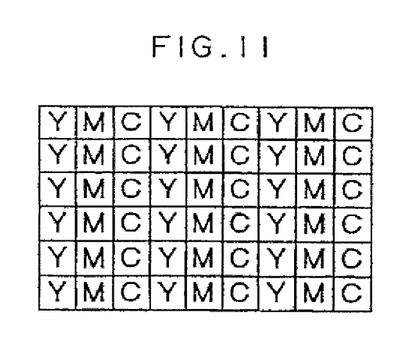
FIG. 11 illustrates another other example of a filter usable in the present invention.

When the filters have colors in a combination that forms achromatic color by the additive color process, it is preferred that the colors in regions adjacent of the regions into which the filters are divided form such combination. For example, when the filters have the combination R, G and B, as shown in FIG. 10, respective colors may be arranged in a repeating stripe manner so as to face stripe electrodes of the substrate. When three stripes of R, G and B are controlled as one pixel, a full-color image can be displayed. Alternatively, as shown in FIG. 11, instead of R, G and B filters, a combination of Y, M and C color filters can also be used.

Figure 12:
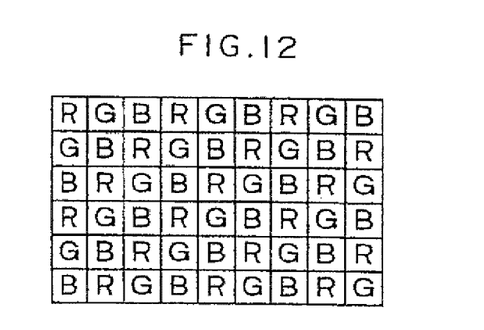
FIG. 12 illustrates still another example of a filter usable in the present invention.
Figure 13:
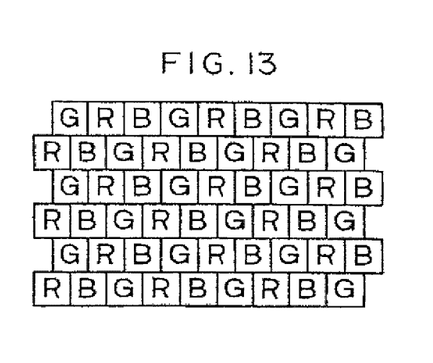
FIG. 13 illustrates a different example of a filter usable in the present invention.
Figure 14:
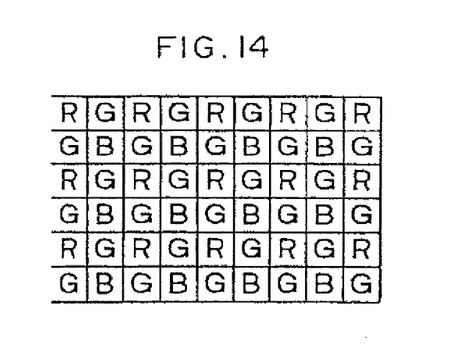
FIG. 14 illustrates a further different example of a filter usable in the present invention.

Further, other various patterns may be formed as the filters, such as a mosaic pattern as shown in FIG. 12, a triangle pattern as shown in FIG. 13, or a pixel array pattern as shown in FIG. 14. Each region may correspond to matrix electrodes or to stripe electrodes of the substrate. In order to drive a passive matrix in a triangle type pattern, electrodes are formed displaced by half pitch for each stripe, and the each adjacent region of the filters is also required to be correspondingly displaced by half pitch.

Figure 15:
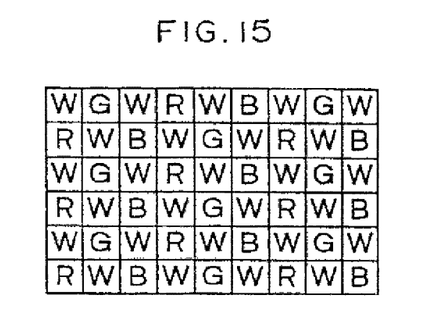
FIG. 15 illustrates a yet further different example of a filter usable in the present invention.

When the filters are divided into plural regions, some of the regions may be colorless. For example, as shown in FIG. 15, the portions other than portions facing the chromatic regions, which are disposed in a diagonal pattern, may be set colorless regions(W). By using white particles as one of two types of particles, which will be described hereinafter, and adhering the white particles in the portions opposite to these colorless (W) regions, the amount of light can be increased.

Figure 16:
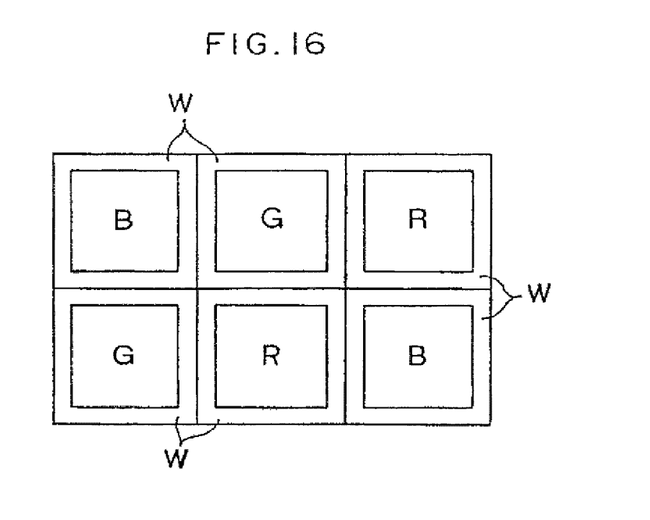
FIG. 16 illustrates a still further different example of a filter usable in the present invention.

Further, as shown in FIG. 16, chromatic regions may be arranged in a matrix form, and each chromatic region surrounded by a colorless region. In this case, black and white particles are used as the two types of particles, and the contrast of lightness can be enhanced by adhering the white particles to portions opposite to the chromatic regions for displaying colors and to portions opposite to the colorless regions surrounding these chromatic regions on the display substrate, and adhering the black particles to the portions opposite to the chromatic regions for not displaying colors and to the portions opposite to the colorless regions surrounding these chromatic regions on the display substrate. By this adjustment of lightness, gray balance can be adjusted in accordance with characteristics of the filters and the light which irradiates the medium, the light being different in different places at which the medium is installed. Moreover, since the adjacent chromatic regions are isolated by the colorless regions, if the amount of reflected light for each color is different, color hue deviation can be prevented. This is particularly effective when displaying achromatic images, which tend to deviate in color hue.

To realize such effects, the substrate must have electrodes corresponding to the pixel regions of the filters and electrodes corresponding to the respective colorless regions.

Each filter may have a base similar to the support base of the display substrate, or, without having such a base, the filter may be formed directly on the support base of the display substrate so as to be integrated with the support substrate. The filters can be manufactured in the same manner as the manufacturing method of a color filter for a liquid crystal. As representative examples, the following four methods are exemplified.

A first method is a relief dyeing method, in which a photosensitive resist (photoresist) is applied onto a base, a predetermined pattern is formed by a photolithographic process, this base is immersed in a dyeing solution to color the photoresist layer, and this series of processes is repeated a plurality of times, with different color dyes. Thus, a desired colored pattern is obtained.

A second method is a pigment dispersion method, in which a dispersion solution in which a pigment is dispersed in a photoresist is applied onto the base and the resulting plate is exposed and developed. This process is repeated a plurality of times, with different color pigments, and a desired colored pattern is obtained. Alternatively, a non-photosensitive polymer material in which pigment is dispersed may be applied onto a substrate, a resist layer is separately formed thereon, and the resulting plate is exposed and developed.

A third method is an electrodeposition method, in which a transparent electrode is formed in a predetermined pattern, and electrodeposition is carried out thereon. This series of processes is repeated a plurality of times, with different color electrodeposition solutions, and a desired colored pattern is obtained.

A fourth method is a printing method, in which a substrate is printed with an ink in which a pigment is dispersed by an offset printing method. This process is repeated plural times, with different color inks.

In particular, the first method is suitable for the present invention because precise registration can be attained.

When the filters are formed on the display substrate to be integrated therewith, a protective layer may be formed on the filters. As the protective layer, a colorless or pale color material is used, and such materials include polymerizable acrylate resin, acrylic-silicone resin, polycarbonate and the like.

Figure 17A:
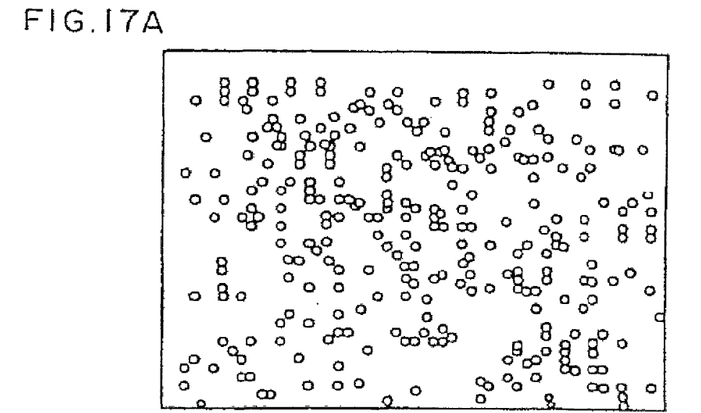
FIG. 17A is a plan view of a surface of a protective layer having a light diffusion function.
Figure 17B:
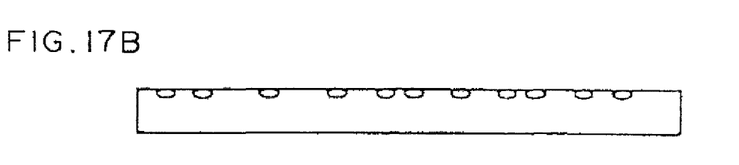
FIG. 17B is a sectional view of the surface of the protective layer having a light diffusion function.

In the present invention, particles adhered to the display surface (in particular spherical particles) can randomly reflect the light incident upon the surface, but if the display surface has a mirror surface, a reflected image of ambient light, in particular, a reflected image of an illuminating light, may be formed. In order to prevent this, it is preferred that the protective layer has a function of diffusing light incident upon the display surface. As shown in FIGS. 17A and 17B, the surface may be roughened by forming dimples randomly on the protective layer, or a diffusion layer containing a filter or the like may be formed on the surface of the protective layer, so that this desired function can be achieved.

As the irradiating means described below, when a front light for illuminating white light from the display side of the image display medium is used, a phase difference plate and a polarizer may be provided on the protective layer in order to cut off light reflected from the panel surface and obtain a desired contrast. If a highly transparent prism material is used as a light guide plate, reduction of image quality while the front light is not lit can be prevented.

The spacers held between the substrates are formed of thermoplastic resin, thermosetting resin, electron beam curing resin, photosetting resin, rubber, metal or the like. Examples of the spacers include a cell type spacer and a granular type spacer. The cell type spacer may be a mesh. Meshes are easily available and inexpensive, are relatively uniform in thickness, and are useful for manufacturing an inexpensive image display medium. However, meshes are not suitable for displaying a fine image, but are suitable for a large-sized image display device for which a high resolution is not required. Cell type spacers include, a sheet provided with dimples in a matrix form by etching or laser processing. As compared with the mesh type spacer, the thickness, dimple shape and dimple size can easily be adjusted for this cell type spacer, and this sheet can be used in an image display medium for displaying a fine image and is effective for enhancing the contrast.

The spacers may be integrated with the substrate: the substrate may be processed by etching or laser processing, or by press-working or printing by using a prefabricated pattern, to form a substrate and spacers having a cell pattern having a desired size. In this case, the spacers may be formed at either the display substrate side or the back substrate side, or at both sides.

The spacers having a cell structure may be either chromatic or colorless, but it is preferred that they be colorless and transparent so as not to have adverse effects on the display image. For example, a transparent resin such as polystyrene, polyester or acrylic resin may be used. In the case of chromatic spacers having a cell structure, it is preferred that one pixel corresponds to 2n cells (n is a positive integer).

The spacer particles are preferably transparent, and, as well as transparent resin particles of polystyrene, polyester or acrylic resin, glass particles may be used.

Examples of the two types of particles having different colors and charge polarities used in the present invention include glass beads, insulating metal oxide particles of alumina, titanium oxide or the like, thermoplastic or thermosetting resin particles, resin particles having a coloring agent on the surface thereof, and particles containing an insulating coloring agent in thermoplastic or thermosetting resin.

The thermoplastic resins used in manufacture of the particles include single polymers or copolymers of styrenes, such as styrene and chlorostyrene, mono-olefins such as ethylene, propylene, butylene and isoprene, and vinyl esters such as vinyl acetate, vinyl propionate, vinyl benzoate, vinyl butyrate, a-methylene aliphatic ester monocarbonates such as methyl acrylate, ethyl acrylate, butyl acrylate, dodecyl acrylate, octyl acrylate, phenyl acrylate, methyl methacrylate, ethyl methacrylate, butyl methacrylate, dodecyl methacrylate, vinyl methyl ether, vinyl ethyl ether, vinyl butyl ether, and vinyl ketones such as vinyl methyl ketone, vinyl hexyl ketone, and vinyl isopropenyl ketone. The thermosetting resins used for manufacturing particles include crosslinking copolymers mainly composed of divinyl benzene, crosslinking resins such as crosslinking polymethyl methacrylate, phenol resins, urea resins, melamine resins, polyester resins, and silicone resins. In particular, representative binder resins include polystyrenes, styrene-alkyl acrylate copolymers, styrene-alkyl methacrylate copolymers, styrene-acrylonitrile copolymers, styrene-butadiene copolymers, styrene-maleic anhydride copolymers, polyethylene, polypropylene, polyester, polyurethane, epoxy resin, silicone resin, polyamide, modified rosin, paraffin wax, and the like.

As the coloring agents, organic or inorganic pigments and oil soluble dyes can be used. Those coloring agents include known coloring agents such as magnetite, ferrite, other magnetic powders, carbon black, titanium oxide, magnesium oxide, zinc oxide, phthalocyanine copper type cyan coloring materials, azo type yellow coloring materials, azo type magenta coloring materials, quinacridone type magenta coloring materials, red coloring materials, green coloring materials, and blue coloring materials. Aniline blue, chalcoyl blue, chrome yellow, ultramarine blue, Du Pont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C Blue 15:1, C.I. Pigment Blue 15:3, and the like are exemplified as representative examples. Porous sponge particles and hollow particles enclosing air therein can be used as white particles. These particles can be selected so that the color hue of the two types of particles is different from one another. To obtain a high contrast, preferably, one is white and the other is black.

The shape of the particles is not particularly limited, but spherical particles having low physical adhesive force between the particles and the substrates and high flowability of the particles are preferred. The spherical particles may be formed by suspension polymerization, emulsion polymerization, dispersion polymerization or the like.

The size of primary particles of the particles is generally 1 to 1000 μm, and preferably 5 to 50 μm, but is not particularly limited to this range. To obtain a high contrast, the particle sizes of the two types of particles are preferably nearly the same. In this way, it is possible to eliminate a drawback of reduction of the inherent color density of large particles resulting from the large particles being surrounded by small particles.

An external additive may be adhered onto the surface of the particles. The color of the external additive is preferably white or transparent so as not to affect the color of the particles.

As the external additive, inorganic fine particles of metal oxides such as silicon oxide (silica), titanium oxide alumina and the like may be used. To adjust the charging property, flowability or environmental dependence of the fine particles, the surface of the particles may be treated with a coupling agent or silicone oil.

Coupling agents having a positive charging property, such as an amino silane coupling agent, amino titanium coupling agent, nitrile coupling agent and the like, or having a negative charging property, such as a nitrogen-free silane coupling agent (composed of atoms other than nitrogen atoms), titanium coupling agent, epoxy silane coupling agent, and acrylic silane coupling agent, are exemplified. Similarly, silicone oils having a positive charging property, such as amino-modified silicone oil, or having a negative charging property, such as dimethyl silicone oil, alkyl-modified silicone oil, a-methyl sulfone-modified silicone oil, methyl phenyl silicone oil, chlorophenyl silicone oil, and fluorine-modified silicone oil, are exemplified. These are selected for the external additive in accordance with a desired resistance.

Among these external additives, well-known hydrophobic silica and hydrophobic titanium oxide are preferably used. In particular, a titanium compound obtained by reaction between $TiO(OH)_2$ and a silane compound such as a silane coupling agent as disclosed in Japanese Patent Application Laid-open No. 10-3177 is preferred. As the silane compound, chlorosilane, alkoxy silane, silazane, or a certain silanizing agent may be used. The titanium compound is manufactured such that $TiO(OH)_2$ prepared in a wet process is allowed to react with the silane compound or silicone oil, followed by drying thereof. Since this can be manufactured without undergoing a calcination process of several hundred degrees, a strong bond among Ti atoms is not formed, there is no aggregation at all, and therefore fine particles thus formed are almost in a state of primary particles. Moreover, $TiO(OH)_2$ is allowed to react with the silane compound or silicone oil directly, and therefore the treating amount of silane compound or silicone oil can be increased, and, by adjusting the treating amount of silane compound and the like, the charging property can be controlled. Moreover, the charging capacity to be imparted to the titanium compound can be notably improved as compared with that of the conventional titanium oxide.

Primary particles of the external additive are generally 5 to 100 nm, and preferably 10 to 50 nm, but the size is not particularly limited thereto.

The blending ratio of the external additive and the particles is properly adjusted in light of the particle size of the particles and the particle size of the external additive. If the external additive is added too much, a part of the external additive may be released from the particle surface, and adhered to the surface of other particles, so that the desired charging property cannot be obtained. Generally, the amount of the external additive is 0.01 to 3 parts by weight, or more preferably 0.05 to 1 part by weight in 100 parts by weight of the particles.

The composition of particles to be combined, particle mixing ratio, presence or absence of the external additive, and composition of the external additive are selected in order to obtain the desired charging property.

External additives may be added to only one of the two types of particles, or to both the types of particles. When adding external additives to both the types of particles, it is preferred to use external additives having different polarities. When the external additives are added to the surface of both the types of particles, it is preferred to adhere the external additives firmly to the particle surfaces by driving the external additives to the particle surfaces with an impact force, or heating the particle surfaces. In this way, formation of aggregates of the external additives resulting from the release of the external additives having opposite polarities from the particles, which aggregates are difficult to dissociate by applying an electric field, can be prevented, and deterioration of image quality can also be prevented.

The contrast varies with the colors of the two types of particles and with particle sizes, and also with the mixing ratio of these particles. In order to obtain a high contrast, it is preferred to determine the mixing ratio so that the surface areas of the two types of particles are nearly the same. If such ratio is largely deviated from, the color of particles of the higher ratio will become dominant.

In the present invention, in order to obtain a high display contrast, as the two types of particles, it is preferred to use particles having a high light reflectivity and particles having a high light absorbance. Natural light, external light, or light from a front light attached to the medium transmits through the color filters, and only the light of specific wavelengths is incident upon the particles. The particles having a light reflective property preferably reflect the light of specific wavelengths with a high reflectivity, and the particles having a light absorbing property preferably absorb the light of specific wavelengths with a high absorbance. A preferred combination of the two types of particles is a combination of white particles and black particles. White particles have the highest lightness and highest light reflectivity of all colors. When white particles are combined with black particles, which have the highest light absorbance, a high contrast can be obtained.

Another preferred combination of the two types of particles is a combination of particles of which the surface at least is metal, and black particles. Since metal has a high light reflectivity, when particles having a metal surface and black particles are combined, a high display contrast can be assured. Particles having a metal surface can be prepared by vapor deposition of metal on the surface of particles made of resin as mentioned above. The metal to be vapor-deposited is preferably a metal having a high light reflectivity, such as silver or aluminum. A further preferred combination is a combination of particles having retroreflectivity and black particles. Retroreflectivity is a property of reflecting incident light in the incident direction by nearly 100%. When retroreflective particles are used, scattered light incident upon the particles is also reflected in the incident direction, and is emitted to outside the medium as scattered light. The scattered light is incident upon an observer's eyes as reflected diffuse light. Therefore, when the retroreflective particles are combined with black particles having a high light absorbance, a higher display contrast can be achieved. Examples of the retroreflective particles include fine transparent beads, glass beads having half of the surface processed by vapor deposition, and the like.

The display substrate and back substrate may be fixed by a combination of bolts and nuts, or another fixing means such as a clamp, clip, or frame for securing the substrates may be used.

The image display medium can be used in an electronic bulletin board, circulation board, electronic blackboard, advertisement, sign board, flickering sign, electronic paper, electronic newspaper, electronic book, document sheets commonly used in a copier or a printer, and the like, which are all capable of storing and rewriting images.

In the image display medium, the density of particles adhered to the display substrate may be changed by varying the voltage to vary the density, or the density may be changed on the basis of an area type gradation by varying the area of the electrodes to be driven.

An image display device of the present invention is described hereinafter.

The image display device of the present invention comprises the image display medium explained above, and an irradiating means for irradiating the display substrate side of this image display medium with white light.

As the irradiating means, various types of irradiating means known as front lights can be used. For example, a means for irradiating white light from a side end surface of the display substrate into the interior thereof is exemplified.

In the image display device of the present invention, instead of the filters, spectrally light-splitting means disposed between the irradiating means and display substrate may be used. Examples of the spectrally light-splitting means include a prism and hologram.

With reference to the drawings, specific embodiments of the image display medium and image display device of the present invention will be explained below.

Figure 1:
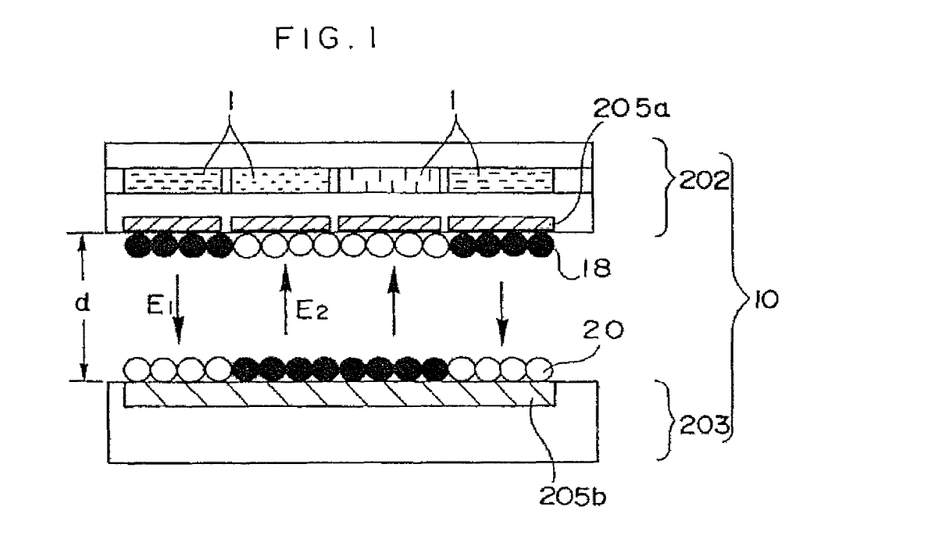
FIG. 1 is a partial sectional view of an image display medium in an embodiment of the present invention.
Figure 2:
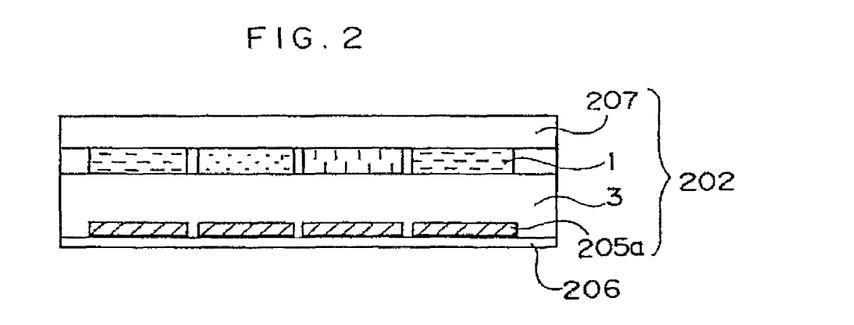
FIG. 2 is a sectional view of a display member of the image display medium in FIG. 1.
Figure 3:
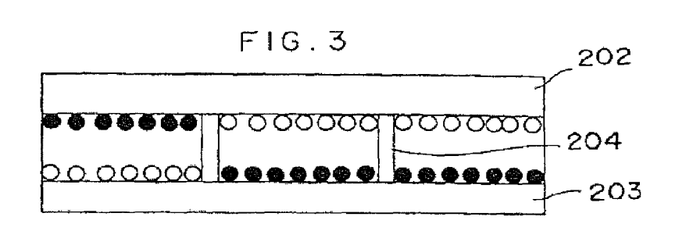
FIG. 3 is a sectional view of the image display medium in FIG. 1 showing spacers.

FIG. 1 shows an image display medium in a first embodiment of the present invention. An image display medium 10 comprises a display member 202, a back substrate 203, spacers 204 (FIG. 3) having a cell structure held between the member and the substrate, and first particles 18 and second particles 20, whose colors and charge polarities are different from one another, enclosed in the space formed between the display member 202 and back substrate 203. The back substrate 203 has an electrode 205b. Further, as shown in FIG. 2, the display member 202 includes a transparent support base 3, a transparent electrode 205a formed thereon, a transparent dielectric layer 206 formed on the transparent electrode 205a, filters 1 formed on an opposite side from the transparent electrodes 205a side of the support base 3, and a protective layer 206 thereon. Both of the two electrodes may be connected to a power source, oe one of the electrodes may be connected to the power source and the other (for example, the transparent electrode 205a) grounded. A voltage may be applied to one substrate only, or to both the substrates.

The order of the layers of the display member 202 is not particularly limited to the above.

Figure 4A:
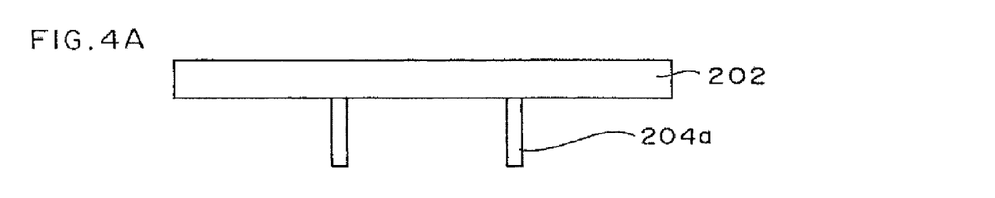
FIG. 4A is a sectional view of a display substrate in an embodiment of the present invention.
Figure 4B:
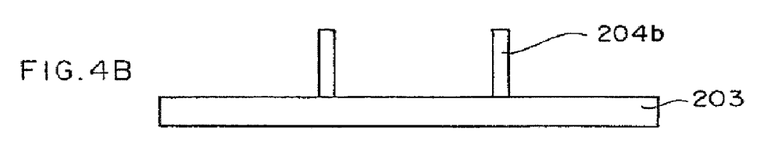
FIG. 4B is a sectional view of a back substrate in the embodiment of the invention.

This image display medium 10 can be manufactured by disposing the spacers 204 on the back substrate 203, incorporating a mixture of the two types of particles into each cell, disposing the display member 202 thereabove, and fixing the back electrode 203 and display member 202 by clamping means or other means. As mentioned above, the spacers 204 may be formed on the display substrate side, or back substrate side, or on both sides. Further, as shown in FIG. 4A, the spacers 204a may be formed integrally with the display member 202, or, as shown in FIG. 4B, the spacers 204b may be integrally formed with the back substrate 203.

Figure 5:
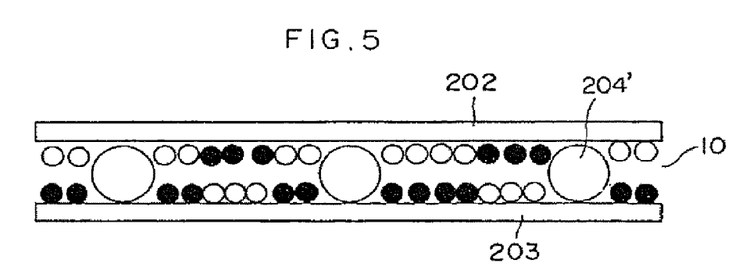
FIG. 5 is a partial sectional view of an image display medium in another embodiment of the present invention.

The shape of the spacers is not particularly limited to those mentioned above. As shown in FIG. 5, the gap between the substrates 202 and 203 can be defined, for example, by enclosing spacer particles 204' having a size equivalent to a desired gap in the gap between the substrates 202 and 203. When such spacer particles 204' are used, irregular distribution of the two types of particles cannot be prevented as in the case of forming the cell structure, but the image display medium can be manufactured very easily and inexpensively as compared with the case of forming the cell structure.

As mentioned above, the colors of the first and second particles are preferably black and white. In particular, the following particles are preferably used.

The first particles are particles having a volume average particle size of 20 μm obtained by sorting spherical particles of a carbon-containing crosslinking polymethyl methacrylate (TECHPOLYMER MBX-20-BLACK of Sekisui Plastics Co., Ltd.).

The second particles are prepared by adding and stirring 0.4 parts by weight of an external additive to 100 parts by weight of particles with a volume average particle size of 20 μm, obtained by sorting spherical particles of a titanium-containing crosslinking polymethyl methacrylate (TECHPOLYMER MBX-20-WHITE of Sekisui Plastics Co., Ltd.).

The external additive is prepared by dissolving ilmenite in sulfuric acid, separating an iron component therefrom, adding water to the resultant TiOSO4 to hydrolyze and produce TiO(OH)2, stirring 100 parts of the resultant TiO(OH)2 dispersed in 500 cm3 of water at room temperature, dropping 50 parts of isopropyl trimethoxy silane therein, filtering the fine particles in the obtained mixed solution, washing in water repeatedly, drying the resulting titanium compound which has been surface-treated with isopropyl trimethoxy silane at 150° C., and pulverizing for 2 minutes by using a sample mill (average primary particle size 30 nm).

The first particles and second particles are mixed at a ratio of 1:2 by weight.

The functional mechanism of the image display medium 10 using such particles will be explained with reference to FIG. 6 and FIG. 7.

When a positive direct current is applied to the transparent electrode 205a of the display member 202, negatively charged white particles at the side of the back substrate 203 are moved to the side of the display member 202 by the action of an electric field. At this time, the positively charged black particles are moved to the side of the back substrate 203.

Figure 6:
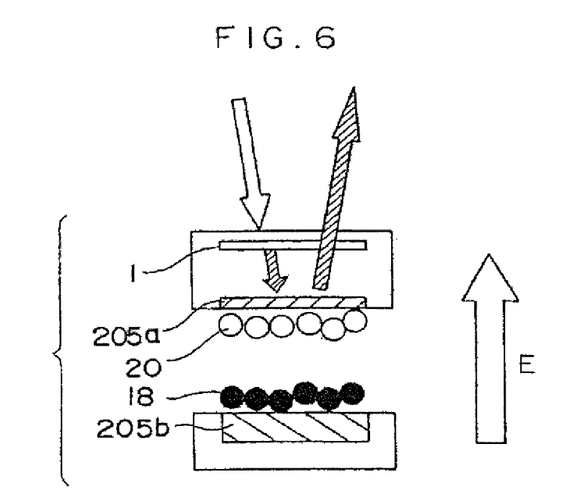
FIG. 6 is a partial sectional view explaining the functional mechanism of the image display medium in FIG. 1.

In a region of the display member 202 to which the white particles are adhered, as shown in FIG. 6, when white light is incident upon the member 202, only light of specific wavelengths corresponding to a filter transmits through the filter, and the white particles are irradiated with the transmitted light. This light is reflected by the white particles, transmits through the filter again, and comes out of the image display medium 10.

Figure 7:
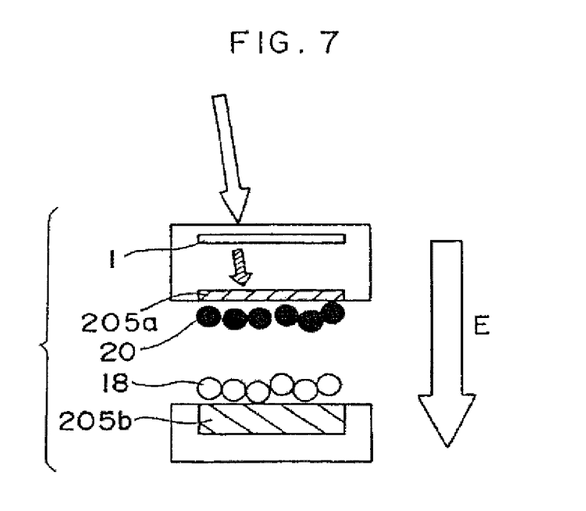
FIG. 7 is a partial sectional view explaining the functional mechanism of the image display medium in FIG. 1.

On the other hand, in a region of the display member 202 to which the black particles are adhered, as shown in FIG. 7, when the white light is incident upon the member 202, only the light of specific wavelengths corresponding to a filter transmits through the filter, and the black particles are irradiated with the transmitted light. This light is completely absorbed by the black particles, and this region becomes black. Thus, an image is displayed with the colors of the filters and black. When the colors of the filters are R, G and B, a full-color image can be displayed.

Figure 8:
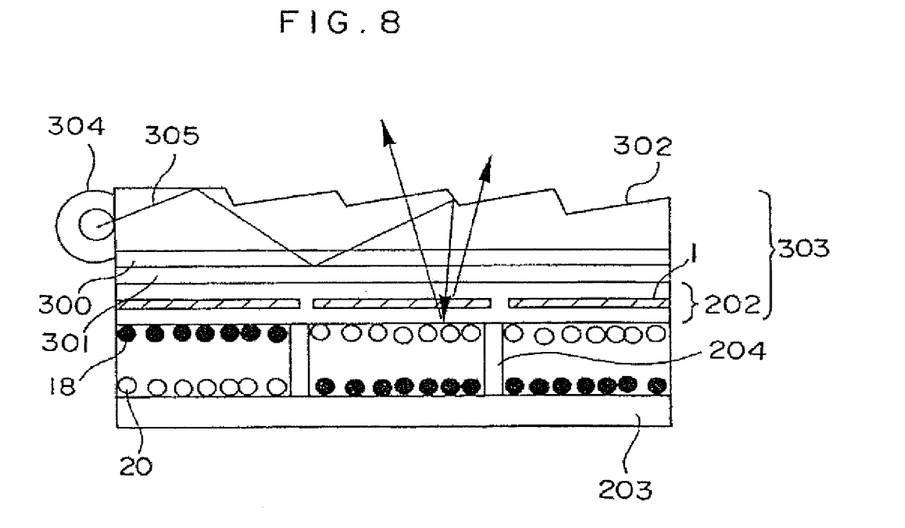
FIG. 8 is a sectional view of an image display device in an embodiment of the present invention.

FIG. 8 shows an image display device in a second embodiment of the present invention. Components the same as those in the image display medium 10 are denoted with identical reference numerals, and descriptions thereof are omitted. The image display device comprises a display member 303, the back substrate 203, the spacers 204 having a cell structure held between the display member 303 and the back substrate 203, the first particles 18 and the second particles 20 whose colors and charge polarities are different from one another enclosed in the space formed between the display member 303 and the back substrate 203, and a front light 304 for emitting white light from a side end portion of the display member 303 to the inside thereof. The display member 303 has a structure integrated with the display member 202, a phase difference plate 301, a polarizer 300, and a light guide plate 302 having prisms.

When the external light is dim, light is emitted from the front light 304. This emitted light 305 is reflected by the prisms and propagated through the light guide plate 302, so that the light spreads over the entire region of the display member 303.

Figure 9A:
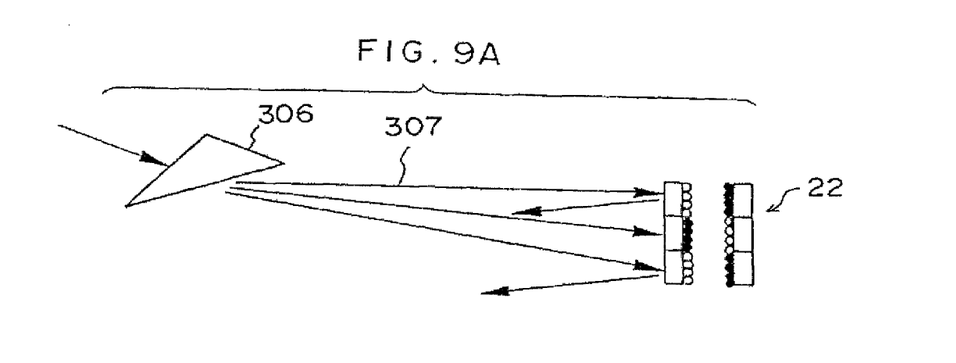
FIG. 9A illustrates a main part of an image display device in another embodiment of the present invention.

FIG. 9A shows a schematic structure of an image display device in a third embodiment of the present invention. Components the same as those in the image display medium 10 are denoted with identical reference numerals, and descriptions thereof are omitted. This image display device comprises an image display medium 22 which is same as the image display medium 10 except that filters are not provided, and a prism 306 and a front light.

In this image display device, the image display medium 22 is irradiated with light having the wavelengths selected by the prism 306 to display a color image. Since the diffraction angle varies with each color depending on the characteristic of dispersing wavelengths of the material forming the prism 306, incident light 307 which is slightly deviated in angle for each one of three primary colors can be obtained when a parallel white light beam is incident upon the prism 36.

Figure 9B:
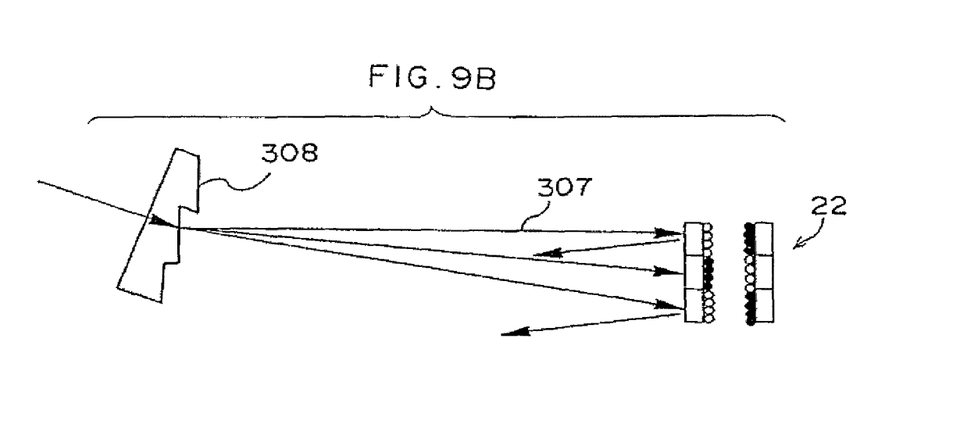
FIG. 9B illustrates a main part of an image display device in still another embodiment of the present invention.

In this image display device, as shown in FIG. 9B, a hologram 308 may be used in place of the prism 306. The angle of diffraction generated by the lattice pitch of the hologram 308 varies with the wavelength. By making use of this property, the incident light 307, which is slightly different in incident angle for each one of the three primary colors, can be obtained.

In this image display device, except that filters are not used at the display medium, by using a display medium the same as the display medium 303, the prism is selectively irradiated with monochromatic lights of different wavelengths.

The present invention can provide an inexpensive image display medium excellent in light fastness and heat resistance, capable of displaying a multi-color image with a high contrast, and easy for adjusting colors, and an image display device and an image display method using the same.

What is claimed is:

1. A reflective image display medium comprising:
   a filter including a first region having a chromatic color;
   a back substrate;
   a plurality of first particles that reflect light;
   a plurality of second particles having substantially black color and having opposite polarity to the first particles; and
   a plurality of cells disposed between the filter and the back substrate, each of the cells having the first particles and the second particles; wherein,
      when the chromatic color is displayed, the first particles are moved by an electric field to a filter side in the cell, and concentrated in a first area corresponding to the first region in the cell, and reflect a light to an outside of the reflective image display medium through the first region,
      when a black color is displayed, the second particles are moved by an electric field to the filter side in the cell and concentrated in the first area, and absorb a light irradiated to the second particles,
   the filter includes a second region that transmits a white light to an outside of the reflective image display medium, and
      when the chromatic color is displayed, the first particles concentrate in the first area and a second area corresponding to the second region in the cell, and reflect a light to the outside of the reflective image display medium through the first region and the second region.

2. The reflective image display medium according to claim 1, wherein
   when the chromatic color is displayed, the second particles are moved to a back substrate side in the cell and concentrated in the back substrate side in the cell, and
   when the black color is displayed, the first particles are moved to the back substrate side in the cell and concentrated in the back substrate side in the cell.

3. The reflective image display medium according to claim 1, wherein the first particles are at least one of substantially white colored particles, metal surfaced particles and retroreflective particles.

4. The reflective image display medium according to claim 1, wherein the cells are formed using a spacer disposed between the filter and the back substrate.

5. The reflective image display medium according to claim 1, wherein the cells are formed using a material having a spherical shape.

6. The reflective image display medium according to claim 1, wherein the filter includes a plurality of first regions, and each of the first regions have a different chromatic color.

7. The reflective image display medium according to claim 6, wherein each of the first regions and the second region have a substantially same shape and size.

8. The reflective image display medium according to claim 6, wherein each of the first regions is surrounded by the second region.

9. The reflective image display medium according to claim 6, wherein each of the first regions have any one of colors in a combination capable of forming an achromatic color by an additive process.

10. The reflective image display medium according to claim 1, wherein the second region is colorless.

11. The reflective image display medium according to claim 1, further comprising a plurality of electrodes that generates the electric field,
   wherein the electrodes are disposed in areas corresponding to the first region and the second region.

12. The reflective image display medium according to claim 1, further comprising a front light that emits light to an inside of the reflective image display medium.

13. The reflective image display medium according to claim 12, wherein the front light is disposed at a side end portion of the reflective image display medium.

14. The reflective image display medium according to claim 12, further comprising a light guide that guides the light from the front light to the inside of the reflective image display medium.

15. The reflective image display medium according to claim 14, wherein the filter is disposed between the plurality of cells and the light guide.

* * * * *